United States Patent Office 2,769,790
Patented Nov. 6, 1956

2,769,790

BLENDED ASPHALTIC COMPOSITIONS

Murray H. Edson, Rahway, and Thomas S. Tutwiler, Watchung, N. J., assignors to Esso Research and Engineering Company, a corporation of Delaware No Drawing. Application April 23, 1952,
Serial No. 283,969

3 Claims. (Cl. 260—28.5)

This invention concerns a novel asphalt composition obtained by the blending of certain vinyl ether polymers in conventional asphalts. The invention is of particular application to air-blown asphalts since incorporation of suitable vinyl ether polymers substantially improves the properties of these asphalts for many applications.

The present invention concerns the production and refining of asphalts obtained from petroleum oils. The principal objective of the process herein disclosed is to provide asphalts having unusual properties; in particular, asphalts are obtained which have unusually high penetration and ductility properties for a given softening point, although, as will be brought out, other desirable properties may also be realized. This unusual combination of characteristics is demanded in a number of applications, an outstanding example of which is the lining of irrigation canals. Asphalts employed to line irrigation canals ideally should have properties to enable the asphalt lining to retain its shape in hot weather, to be non-brittle in cold weather, and to conform to the contour of the surface of the canal without tearing. Asphalts having these properties must have a softening point (ASTM test D36–26) of about 175° to 200° F., and must have high ductility and high values of penetration. The minimum ductility is about 3.5, employing ASTM test D113–44. The desired penetration is in the range of about 50–60 at 77° as measured by ASTM test D5–49.

It has been found that asphalts obtained by conventional processing methods do not have this combination of properties. More precisely, the asphalts obtained by conventional processing techniques, in the range of softening points and penetrations identified, have too low a ductility.

It is therefore the principal object of this invention to provide an asphalt treating process which will vary the usual combination of softening point, penetration, and ductility properties. To bring out the manner in which these asphalt properties are affected, it is helpful to consider the results of subjecting crude residua to an oxidation treatment as achieved by conventional air blowing. Oxidation treatments of this character are well known to the art and it has been appreciated that the low temperature susceptibility of asphalts may to some extent be improved by oxidation. However, when air blowing is applied and continued, while the softening point of an asphalt is raised, the penetration is decreased and the ductility is lowered. Consequently, differing from this change in asphalt properties, the process of this invention provides an increase in penetration properties and an increase in ductility concomitant with the increase in softening point of the asphalt. More explicitly, the process of this invention affects the properties of particular asphalts by:

(1) Increasing the ductility while maintaining the penetration and softening point properties;
(2) Increasing the ductility and softening point while decreasing the penetration;
(3) Increasing the penetration and ductility while decreasing the softening point, or
(4) Increasing the softening point, ductility and penetration properties.

In accordance with this invention these objectives are achieved by incorporating minor portions of the polymers of vinyl ether compounds. The polymers to be employed may be represented by the following monomeric formula:

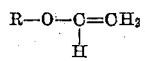

$$R-O-\underset{H}{C}=CH_2$$

in which R represents an alkyl or alkoxy-alkyl group having from 1 to 20 carbon atoms, although preferably having about 3 to 8 carbons. The polymers of the above-identified general formula have molecular weights varying from about 2,000 to 100,000 as determined by the Staudinger molecular weight method. The preferred range in molecular weight for the purposes of this invention is 15,000 to 50,000. Polymers of this character are generally oil-soluble and vary in properties from viscous liquids to rubber-like materials depending upon the molecular weight. Examples of such polymers or copolymers falling within the scope of this invention are those prepared from vinyl isobutyl ether, isopropyl vinyl ether, 2-ethylhexyl vinyl ether, methoxyethyl vinyl ether, etc., or mixtures of two or more of the above. Polymers of this character may be prepared as follows: The polymerization is carried out either in bulk or in solution using Friedel-Crafts or related catalysts. Such catalysts include $BF_3$, $BF_3$ complexes, $SnCl_4$, $GaCl_3$, iodine, aluminum salts, etc. Solvents that can be employed include hydrocarbons, halogenated hydrocarbons, and ether type compounds. Polymerization temperatures in the range of $+100°$ C. to $-100°$ C. are employed, preferably in the range of $0°$ C. to $-80°$ C. The resulting polymers are treated to remove catalyst residues and are inhibited with 0.1 to 5% of a suitable amine or phenolic type oxidation inhibitor. Such inhibitors include phenyl alpha naphthyl amine, substituted phenol sulfides, morpholine derivatives, substituted diphenyl amines and the like.

The nature and advantages of this invention may be understood by reference to the following examples:

EXAMPLE I

An air-blown asphalt having an original softening point of 186° F. and a ductility of 2.7 was combined with varying proportions of a polyvinyl isobutyl ether having a molecular weight of 43,000. The ether polymer was incorporated in the asphalt by simple admixture at 275° to 350° F. Inspections of the original asphalt and the final asphalt product obtained are indicated in the following table:

*Table I*

| | Air-blown Venezuelan Asphalt | Polyvinyl Isobutyl Ether, 43,000 Molecular Weight Staudinger | | |
|---|---|---|---|---|
| | | Wt. Percent Polymer | | |
| | | ½ | 2 | 5 |
| Softening Pt. (R. & B.), °F., ASTM D36-26 | 186 | 195 | 197 | 211 |
| Penetration, 77°/100g./5″, ASTM D5-49 | 63 | 57 | 47 | 52 |
| Penetration, 32°/200 g./60″, ASTM D5-49 | 48 | 42 | 39 | 39 |
| Penetration, 115°/50g./5″, ASTM D5-49 | 71 | 84 | 77 | 89 |
| Ductility at 77°, CM., ASTM D113-44 | 2.7 | 5.0 | 7.9 | 10.8 |
| Pliability, 20° F., Degrees | 180+ | 180+ | 180+ | 180+ |
| Impact, 20° F., Inches | 8½ | 6 | 7 | 15 |

It will be noted from these data that inclusion of the polymer in proportions of from ½ to 5% serves to raise the softening point of the asphalt while materially improving the ductility properties of the asphalt.

EXAMPLE II

An asphalt having an original softening point of 209° F. and a ductility of 2 was admixed with from ½ to 5% of a copolymer of isopropyl vinyl ether and 2-ethylhexyl vinyl ether having a Staudinger molecular weight of 29,500. Again, it was found that the final asphalt product had substantially improved properties, particularly the softening point, ductility, and impact resistance. The inspections of the asphalts of this example are given in Table II below:

*Table II*

|  | Air-blown Asphalt | 88/12 Mol Ratio Isopropyl Vinyl Ether-2-Ethylhexyl Vinyl Ether Copolymer, 29,500 Molecular Weight Staudinger | | |
|---|---|---|---|---|
|  |  | Wt. Percent Polymer | | |
|  |  | ½ | 2 | 5 |
| Softening Pt. (R. & B.), ° F | 209 | 207 | 214 | 215 |
| Penetration, 77°/100 g./5'' | 57 | 51 | 50 | 49 |
| Penetration, 32°/200 g./60'' | 45 | 40 | 43 | 39 |
| Penetration, 115°/50 g./5'' | 65 | 74 | 70 | 70 |
| Ductility, 77°, CM | 2.0 | 2.6 | 6.3 | 30.5 |
| Pliability, 20° F., Degrees | 180+ | 180+ | 180+ | 180+ |
| Impact, 20° F., Inches | 7 | 7 | 7½ | 8½ |

EXAMPLE III

Polyvinyl isobutyl ether having a Staudinger molecular weight of 24,500 was incorporated in an oxidized asphalt having a softening point of 186° F. In one experiment ½% of the indicated polymer was admixed in the asphalt while in another experiment 2% of this polymer was mixed in the asphalt. The properties of the original asphalt and the final asphalt products are shown in the following table. Again, it will be observed that the properties of this asphalt were substantially improved by inclusion of the polymer:

*Table III*

|  | Air-Blown Asphalt | Polyvinyl Isobutyl Ether, 24,500 Molecular Weight Staudinger | |
|---|---|---|---|
|  |  | Wt. Percent Polymer | |
|  |  | ½ | 2 |
| Softening Pt. (R. & B.), ° F | 186 | 189 | 194 |
| Penetration, 77°/100 g./5'' | 63 | 60 | 59 |
| Penetration, 32°/200 g./60'' | 48 | 45 | 44 |
| Penetration, 115°/50 g./5'' | 71 | 91 | 84 |
| Ductility, 77°, Cm | 2.7 | 4.7 | 11.6 |
| Pliability, 20° F., Degrees | 180+ | 180+ | 180+ |
| Impact, 20° F., Inches | 8½ | 14 | 18 |

EXAMPLE IV

Finally, a copolymer of an alkyl vinyl ether and an alkoxy vinyl ether was prepared and mixed with an asphalt. The polymer employed was 2-methoxy ethyl vinyl ether, isobutyl vinyl ether, 2-ethylhexyl vinyl ether copolymer having a Staudinger molecular weight of 20,300. The properties of the original asphalt and the asphalt containing this polymer are indicated in Table IV:

*Table IV*

|  | Base Asphalt | 30/38/32 MOL RATIO 2-Methoxyethyl Vinyl Ether, Isobutyl Vinyl Ether, 2-Ethylhexyl Vinyl Ether Copolymer; 20,300 Molecular Weight Staudinger | |
|---|---|---|---|
|  |  | Wt. Percent Polymer | |
|  |  | ½ | 2 |
| Softening Pt. (R. & B.), ° F | 186 | 188 | 198 |
| Penetration, 77°/100 g./5'' | 71 | 64 | 65 |
| Penetration, 32°/200 g./60'' | 51 | 48 | 51 |
| Penetration, 115°/50 g./5'' | 112 | 92 | 89 |
| Ductility, 77°, Cm | 2.6 | 3.7 | 8.0 |

As described, the invention concerns the incorporation in an asphalt of about 0.1% to 20% of a polymer of an alkyl or alkoxy-alkyl vinyl ether. These compounds may be admixed directly in the asphalt or oil concentrate of the polymers may first be prepared. Any desired fraction of petroleum oil may be used as the vehicle although preferably a heavy viscous oil is employed serving to hold the polymers as a dispersion if not a solution. As an example of this technique, an oil concentrate of polyvinyl isobutyl ether having a molecular weight of 43,000 was prepared. An oil having a viscosity of 78 Saybolt Seconds Universal at 210° F. was employed providing an 8.6% concentrate of the polymer. Sufficient concentrate to provide ¼% of polymer was then incorporated in an airblown Venezuelan asphalt. The inspections of the asphalt before and after addition of the polymer are shown in the following table:

*Table V*

OIL CONCENTRATE OF POLYVINYL ISOBUTYL ETHER ADDED TO ASPHALT

|  | Original | Plus ¼% Polymer |
|---|---|---|
| Softening Pt. (R. & B.), ° F | 186 | 191 |
| Penetration, 77°/100 g./5'' | 63 | 64 |
| Penetration, 32°/220 g./60'' | 48 | 50 |
| Penetration, 115°/50 g./5'' | 71 | 95 |
| Ductility at 77°, Cm | 2.7 | 3.4 |
| Pliability, 20° F., Degrees | 180+ | 180+ |
| Impact, 20° F., Inches | 8½ | 12 |

It will be observed from these data that inclusion of the oil concentrate of the polymers served to raise the softening point of the asphalt which substantially improves the ductility of the asphalt.

What is claimed is:

1. An asphalt composition having a ductility of at least 3.5 and consisting of an asphalt containing about 0.1 to 20% by weight of a polymeric vinyl ether compound, said polymeric ether being a polymer of a polymerizable mixture consisting of at least one ether having the formula:

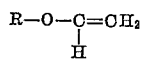

in which R is selected from the group consisting of alkyl and alkoxy-alkyl radicals having about 1 to 20 carbon atoms, and said polymer having a Staudinger molecular weight of about 2,000 to 100,000.

2. The composition defined by claim 1 in which the said asphalt is an oxidized asphalt.

3. An asphalt composition having a ductility of at least 3.5 and consisting of a base asphalt stock containing about 0.1 to 20% of polymeric polyvinyl isobutyl ether, said ether having a Staudinger molecular weight of from about 2000 to 100,000.

References Cited in the file of this patent

UNITED STATES PATENTS 2,545,963     Mack _____ Mar. 20, 1951

FOREIGN PATENTS

| | | |
|---|---|---|
| 604,408 | Great Britain _____ | July 2, 1948 |
| 740,097 | France _____ | Jan. 20, 1933 |
| 893,307 | France _____ | June 6, 1944 |
| 895,032 | France _____ | Jan. 12, 1945 |